United States Patent [19]

Tanaka et al.

[11] Patent Number: 5,573,589
[45] Date of Patent: Nov. 12, 1996

[54] CEMENT COMPOSITIONS CONTAINING A SULFATED POLYSACCHARIDE AND METHOD

[75] Inventors: Yoshio Tanaka; Toshiyuki Uryu, both of Tokyo; Minoru Yaguchi, Fujisawa, all of Japan

[73] Assignee: Sandoz Ltd., Basel, Switzerland

[21] Appl. No.: 402,452

[22] Filed: Mar. 9, 1995

Related U.S. Application Data

[63] Continuation-in-part of Ser. No. 381,582, Jan. 30, 1995, abandoned, which is a continuation of Ser. No. 207,644, Mar. 8, 1994, abandoned.

[30] Foreign Application Priority Data

Mar. 10, 1993 [JP] Japan .................................. 5-87717
Mar. 9, 1994 [JP] Japan .................................. 6-75239

[51] Int. Cl.$^6$ .................... C04B 24/38; C04B 24/16; C04B 24/20
[52] U.S. Cl. ............... 106/804; 106/730; 106/805; 106/823; 106/729
[58] Field of Search ................... 106/674, 726, 106/729, 730, 804, 805, 809, 162, 163.1, 164, 169, 188, 196, 197.1, 197.2, 198, 205, 823, 210; 524/2, 650

[56] References Cited

U.S. PATENT DOCUMENTS

| | | | |
|---|---|---|---|
| H493 | 7/1988 | Tegiacchi et al. | 106/726 |
| 2,583,657 | 1/1952 | Lea et al. | 106/726 |
| 2,697,093 | 12/1954 | Jones | 536/48 |
| 2,795,508 | 6/1957 | Kaveler | 106/726 |
| 2,820,788 | 1/1958 | Filbert et al. | 106/726 |
| 2,995,189 | 8/1961 | Cutforth | 106/726 |
| 3,951,674 | 4/1976 | Curry et al. | 106/674 |
| 4,093,798 | 4/1976 | Tessler | 536/48 |
| 4,573,534 | 3/1986 | Baker et al. | 106/730 |
| 4,814,437 | 3/1989 | de Belder et al. | 536/102 |
| 5,053,398 | 10/1991 | Mori et al. | 536/122 |
| 5,154,771 | 10/1992 | Wada | 106/730 |

FOREIGN PATENT DOCUMENTS

| | | |
|---|---|---|
| 0375174 | 6/1990 | European Pat. Off. . |
| 0432770 | 6/1991 | European Pat. Off. . |
| 0462602 | 12/1991 | European Pat. Off. . |
| 0470444 | 2/1992 | European Pat. Off. . |
| 2671090 | 7/1992 | France . |

OTHER PUBLICATIONS

Derwent Abstract, WPI Accession No. 93–149028/18, JP 05085791 A, Apr. 1993.
Derwent Abstract, WPI Accession No. 91–104847/15, JP 3045544, Feb. 1991.
Derwent Publications Ltd., Class A96, AN84–233672, Aug. 1984.
Derwent Publicatons Ltd., Class A11, AN71–01369S, 1971 (no month).
Derwent Publications Ltd., Class 1304, AN92–147531, Mar. 1992.

*Primary Examiner*—Karl Group
*Assistant Examiner*—Michael Marcheschi
*Attorney, Agent, or Firm*—Robert S. Honor; Carl W. Battle; Carol A. Loeschorn

[57] ABSTRACT

An additive for cementitious compositions comprises at least one sulfated polysaccharide obtained by the sulfation of a polysaccharide, preferably under moderate conditions. The additive enhances the fluidity and workability of cementitious mixes, and gives higher final compressive strength.

32 Claims, No Drawings

CEMENT COMPOSITIONS CONTAINING A SULFATED POLYSACCHARIDE AND METHOD

This is a continuation-in-part of U.S. Ser. No. 08/381,582 filed Jan. 30, 1995, now abandoned, which is in turn a continuation of U.S. Ser. No. 08/207,644 filed Mar. 8, 1994, now abandoned.

This invention relates to additives for use in cementitious compositions such as cement paste, grout, mortar and concrete and more particularly to additives which are capable of modifying the fluidity and workability of such compositions.

It is known that it is possible to manufacture concrete which has excellent fluidity and segregation resistance. This is done by using in combination a cement dispersing agent such as high-range water-reducing agent or a superplasticizer and a cellulose derivative or an acrylate-base thickener (Japan Patent Kokai H3-45544). However, although it improves resistance to segregation by increasing the cohesion of concrete, the use of a thickener has the drawback that it lowers the fluidity of concrete, and it has been necessary to use in combination a comparatively large quantity of cement dispersing agent to improve the fluidity of the concrete. Furthermore, thickeners introduce other undesirable characteristics such as retardation of the time of setting of concrete and excessive entrainment of air.

Moreover, since it is extremely difficult for a thickener to be dissolved in water and difficult to obtain a uniform solution due to gelation when added to a cement dispersing agent solution, there are drawbacks in handling such as the impossibility of feeding a cement dispersing agent solution to which a thickener has been added and dusting and problems in batching when using thickener in powder form.

There is therefore in the art a need for an additive which simultaneously provides a significant water-reducing property and a suitable viscosity, which does not have excessive air-entraining or set retarding properties, whose solubility in water is good and whose handling is easy.

The invention therefore provides a cement additive which comprises at least one sulfated polysaccharide obtained by the sulfation of polysaccharides.

The invention further provides a cementitious composition comprising an effective amount of an additive as hereinabove described.

The sulfated polysaccharides used in the cement additive concerning this invention are obtained by sulfation of polysaccharides. By "polysaccharide" is meant a combination of monosaccharide ($C_6H_{12}O_6$) units (generally at least 9 of such units) linked together by glycosidic bonds. A very large number of naturally-occurring substances of this type are known and they are widely used in industry. Examples of suitable polysaccharides include cellulose, cellulose ethers (especially preferred), alkyl celluloses such as methyl cellulose and ethyl cellulose, hydroxyalkyl alkyl celluloses such as hydroxymethyl ethyl cellulose, hydroxyethyl ethyl cellulose and hydroxypropyl methyl cellulose, dextran, starch and starch derivatives. A variety of natural gums such as gum arabic, gum tragacanth, xanthan gum and guar gum may also be used.

For the purposes of this invention, a further group of especially useful polysaccharides are those derived from bacteria, in particular curdlan, a natural linear (1→3)-β-D-glucan, obtained from *Alcaligenes faecalis* var. myxogenes 10C3 strain.

Sulfation of the previously-mentioned polysaccharides is carried out by known means. Although it is possible to use any known sulfating agent, it is preferred to use sulfating agents which sulfate under moderate conditions. The skilled person will readily appreciate what is meant by "sulfation under moderate conditions", but typical examples of suitable sulfating agents are piperidine sulfuric acid, sulfur pyridine trioxide complex, and chlorosulfuric acid. The use of such materials permits easy control of sulfation and molecular weight and causes little degradation of the polysaccharide chain. It is possible to use strong sulfating agents, such as sulfuric acid itself, but the degree of sulfation and the molecular weight are not so easily controlled. The invention therefore also provides a process of preparing a cement additive as hereinabove described, comprising the sulfation of a polysaccharide under moderate sulfation conditions.

The sulfated polysaccharides useful in this invention preferably have average molecular weights of from 5,000 to 200,000 (determined by gel permeation chromatography, GPC), and the sulfur content is preferably 1.0 to 20.0% by weight of the sulfated polysaccharide. It is possible to use sulfated polysaccharides with sulfur contents of less than 1%, down to as low as 0.01%, although it is generally preferred that the sulfur content is at least 0.4% (measured by elemental analysis). In cases where the sulfur content is less than 1%, it may be necessary to use the sulfated polysaccharide in conjunction with a superplasticizer. In this regard, any of the superplasticizers known to the art may be used, for example, naphthalene sulfonate formalin condensate salts, melamine sulfonate formalin condensates, polycarboxylates, lignosulfonates and alkoxylated styrene-maleic anhydride copolymer derivatives, especially those described in U.S. Pat. No. 5,158,,916 and French Published Application 2,671,090, the contents of which disclosures are incorporated herein by reference. The proportion of superplasticizer used in the compositions will vary according to the precise circumstances of use, but the skilled person can readily make allowance for such circumstances. The relative weight proportions of superplasticizer to sulfated polysaccharide lie in the range of from 6:1 to 4:1.

In general, viscosity of the sulfated polysaccharide is inadequate when its average molecular weight is less than 5,000, and cohesion may be too strong when it exceeds approximately 200,000. When the sulfur content is less than approximately 1.0%, water solubility and water-reducing properties are low and when greater than approximately 20.0%, water-reducing properties tend to be reduced.

Preferably the molecular weight is from 90,000–165,000, more preferably from 100,000–150,000 and the sulfur content is from 5.5–20.0%, more preferably from 12–20% by weight of the sulfated polysaccharide.

Cement additives according to this invention may be used in liquid and in powder form, those in liquid form generally being sulfated polysaccharides dissolved in water, and the concentration may be selected according to the purpose of use and method of use. Further, a cement additive of this invention may be mixed with well-known or customarily-used cement dispersing agents and other additives. Typical examples of such cement dispersing agents are naphthalene sulfonate formalin condensate salt, melamine sulfonate formalin condensate, polycarboxylate, lignosulfonate, oxycarboxylate, polyalkylsulfonate and aromatic sulfonate derivative. Examples of other additives are air content adjusting agents, drying shrinkage reducing agents, accelerators, retarders, foaming agents, defoaming agent, rust inhibitors, quick-setting agents and water-soluble high molecular weight substances.

The invention provides a process of modifying the flow characteristics of a fluid cementitious mix, comprising the addition thereto of an effective amount of an additive as hereinabove described. The dosage of additive used in the working of this invention depends on the cement mixture used, but basically, it is a quantity which imparts the desired fluidity, water reduction or consistency to the cement mixture. A typical suitable quantity of the sulfated polysaccharide lies within the range of from 0.01 to 3.0 percent by weight based on the weight of cement but it is not necessarily limited to this range.

The cement additives of this invention may be used in cement mixtures such as cement paste, mortar, grout, and concrete. They are particularly useful in manufacture of cement mixtures in which both thickener or water-soluble polymer substance and cement dispersing agent are used in combination, for example, non-segregation-under water-concrete, high-strength concrete, lean-mix concrete, cement products, centrifugally-cast cement products, extrusion-formed cement products, prepacked concrete, injection grout, plastering mortar, shotcrete, fiber-reinforced concrete and self-levelling materials.

Examples of the manufacture of sulfated polysaccharides used in the cement additives of this invention and their average molecular weights and sulfur contents are given below.

Manufacturing Example 1

Cellulose ether (HI-METHO 90SH-30,000, manufactured by ShinEtsu Chemical, Tokyo, Japan) is added in the amount of 0.50 parts to 40.0 parts of desiccated dimethyl sulfoxide (DMSO), and agitation is performed at room temperature for 60 minutes. Following agitation, 0.5 part of piperidine sulfuric acid is added after which reaction is allowed to occur for 60 minutes while maintaining the temperature at 80° C. Vacuum distillation is then performed at 65° C. for 15 minutes to remove DMSO from the system. Following this, acetone is added to the residue and the precipitate is collected and after washing with water, neutralization is carried out using $NaHCO_3$ solution, upon which 100 parts of distilled water is added. After treatment by dialysis, the sample is dried and sulfated cellulose ether is obtained. Hereinafter, this will be referred to as "MC1".

Manufacturing Example 2

Cellulose ether (HI-METHO 90SH-30,000, manufactured by ShinEtsu Chemical) is added in the amount of 0.50 parts to 40.0 parts of desiccated dimethyl sulfoxide (DMSO), and agitation is performed at room temperature for 60 minutes. Following agitation, 1.0 part of piperidine sulfuric acid is added after which reaction is allowed to occur for 60 minutes while maintaining the temperature at 80° C. Vacuum distillation is then performed at 65° C. for 15 minutes to remove DMSO from the system. Following this, acetone is added to the residue and the precipitate is collected and after washing with water, neutralization is carried out using $NaHCO_3$ solution, upon which 100 parts of distilled water is added. After treatment by dialysis, the sample is dried and sulfated cellulose ether is obtained. Hereinafter, this will be referred to as "MC2".

Manufacturing Example 3

Cellulose ether (HI-METHO 90SH-15,000, manufactured by ShinEtsu Chemical) is added in the amount of 0.50 parts to 40.0 parts of desiccated dimethyl sulfoxide (DMSO), and agitation is performed at room temperature for 60 minutes. Following agitation, 2.0 parts of piperidine sulfuric acid is added after which reaction is allowed to occur for 60 minutes while maintaining the temperature at 70° C. Vacuum distillation is then performed at 65° C. for 15 minutes to remove DMSO from the system. Following this, acetone is added to the residue and the precipitate is collected and after washing with water, neutralization is carried out using $NaHCO_3$ solution, upon which 100 parts of distilled water is added. After treatment by dialysis, the sample is dried and sulfated cellulose ether is obtained. Hereinafter, this will be referred to as "MC3".

Manufacturing Example 4

Cellulose ether (HI-METHO 90SH-15,000, manufactured by ShinEtsu Chemical) is added in the amount of 0.50 parts to 40.0 parts of desiccated pyridine, and agitation is performed at room temperature for 60 minutes. Following agitation, 2.0 parts of chlorosulfuric acid is added after which reaction is allowed to occur for 60 minutes while maintaining the temperature at 70° C. Vacuum distillation is then performed at 65° C. for 15 minutes to remove pyridine from the system. Following this, acetone is added to the residue and the precipitate is collected and after washing with water, neutralization is carried out using $NaHCO_3$ solution, upon which 100 parts of distilled water is added. After treatment by dialysis, the sample is dried and sulfated cellulose ether is obtained. Hereinafter, this will be referred to as "MC4".

Manufacturing Example 5

Curdlan (manufactured by Wako Junyaku Kogyo, Osaka, Japan) is added in the amount of 0.50 parts to 40.0 parts of desiccated dimethyl sulfoxide (DMSO), and agitation is performed at. room temperature for 2 hours. Following agitation, 0.5 part of piperidine sulfuric acid is added after which reaction is allowed to occur for 60 minutes while maintaining the temperature at 85° C. Vacuum distillation is then performed at 65° C. for 15 minutes to remove DMSO from the system. Following this, acetone is added to the residue and the solids obtained are collected and after washing with water, neutralization is carried out using $NaHCO_3$ solution, upon which 100 parts of distilled water is added. After treatment by dialysis, the sample is dried and sulfated curdlan is obtained. Hereinafter, this will be referred to as "CA1".

Manufacturing Example 6

Curdlan is added in the amount of 0.50 parts to 40.0 parts of desiccated dimethyl sulfoxide (DMSO), and agitation is performed at room temperature for 2 hours. Following agitation, 1.0 part of piperidine sulfuric acid is added after which reaction is allowed to occur for 60 minutes while maintaining-the temperature at 85° C. Vacuum distillation is then performed at 65° C. for 15 minutes to remove DMSO from the system. Following this, acetone is added to the residue and the solids obtained are collected and after washing with water, neutralization is carried out using $NaHCO_3$ solution, upon which 100 parts of distilled water is added. After treatment by dialysis, the sample is dried and sulfated curdlan is obtained. Hereinafter, this will be referred to as "CA2".

Manufacturing Example 7

Curdlan is added in the amount of 0.50 parts to 40.0 parts of desiccated dimethyl sulfoxide (DMSO), and agitation is performed at room temperature for 2 hours. Following agitation, 2.0 parts of piperidine sulfuric acid is added after which reaction is allowed to occur for 60 minutes while maintaining the temperature at 80° C. Vacuum distillation is then performed at 65° C. for 15 minutes to remove DMSO from the system. Following this, acetone is added to the residue and the solids obtained are collected and after washing with water, neutralization is carried out using NaHCO$_3$ solution, upon which 100 parts of distilled water is added. After treatment by dialysis, the sample is dried and sulfated curdlan is obtained. Hereinafter, this will be referred to as "CA3".

Manufacturing Example 8

Curdlan is added in the amount of 0.50 parts to 40.0 parts of desiccated pyridine, and agitation is performed at room temperature for 2 hours. Following agitation, 2.0 parts of chlorosulfuric acid is added after which reaction is allowed to occur for 60 minutes while maintaining the temperature at 80° C. Vacuum distillation is then performed at 65° C. for 15 minutes to remove pyridine from the system. Following this, acetone is added to the residue and the solids obtained are collected and after washing with water, neutralization is carried out using NaHCO$_3$ solution, upon which 100 parts of distilled water is added. After treatment by dialysis, the sample is dried and sulfated curdlan is obtained. Hereinafter, this will be referred to as "CA4".

Manufacturing Example 9

Xanthan gum (manufactured by Sansho) was added in the amount of 0.50 part to 40.0 parts of desiccated pyridine, and agitation was performed at room temperature for 60 minutes. Following agitation, 1.0 part of piperidine sulfuric acid is further added after which the reaction was allowed to occur for 60 minutes while maintaining the temperature at 70° C. This was followed by vacuum distillation to remove pyridine. Acetone was added to the residue and the resulting precipitate was collected, washed with water, neutralzed with NaHCO$_3$ and diluted with 100 parts of distilled water. After treatment by dialysis, the sample was dried to yield the sulfated xanthan gum. Hereinafter, this will be referred to as "XGS".

Manufacturing Example 10

Cellulose (manufactured by Kanto Kagaku) was added in an amount of 0.50 part to 40.0 parts of desiccated dimethyl sulfoxide (DMSO), and agitated at room temperature for 60 minutes. Following agitation, 0.5 part of piperidine sulfuric acid was added and the reaction was allowed to proceed at 80° C. for 60 minutes. The reaction was then vacuum distilled to remove the DMSO. Acetone was added to the residue and the resulting precipitate was collected, washed with water, neutralzed with NaHCO$_3$ and diluted with 100 parts of distilled water. After dialysis, the sample was dried to yield the sulfated cellulose. Hereinafter, this will be referred to as "CLS".

Manufacturing Example 11

Curdlan (manufactured by Wako Junyaku Kogyo) was added in an amount of 0.50 part to 40.0 parts of desiccated dimethyl sulfoxide (DMSO) and the resulting mixture was agitated at room temperature for 2 hours. Following agitation, 2.0 parts of piperidine sulfuric acid was added and the reaction was allowed to proceed at 95° C. for 30 minutes. The reaction was vacuum distilled to remove DMSO. Acetone was added to the residue and the resulting precipitate was collected, washed with water, neutralzed with NaHCO$_3$ and diluted with 100 parts of distilled water. After treatment by dialysis, the sample was dried to yield the sulfated curdlan. Hereinafter, this will be referred to as "CA5".

Manufacturing Example 12

Curdlan was added in an amount of 0.50 part to 40.0 parts of desiccated dimethyl sulfoxide (DMSO) and the resulting mixture was agitated at room temperature for 2 hours. Following agitation, 2.0 parts of piperdine sulfuric acid was added and the reaction was allowed to proceed at 95° C. for 120 minutes. The reaction was vacuum distilled to remove DMSO. Acetone was added to the residue and the resulting precipitate was collected, washed with water, neutralzed with NaHCO$_3$ and diluted with 100 parts of distilled water. After treatment by dialysis, the sample was dried to yield the sulfated curdlan. The resulting sulfated curdlan will hereinafter be referred to as "CA6".

Manufacturing Example 13

Curdlan was added in an amount of 0.50 part to 40.0 parts of desiccated dimethyl sulfoxide (DMSO) and the resulting mixture was agitated at room temperature for 2 hours. Following agitation, 2.0 parts of piperdine sulfuric acid was added and the reaction was allowed to proceed at 95° C. for 120 minutes. The reaction was vacuum distilled to remove DMSO. Acetone was added to the residue and the resulting precipitate was collected, washed with water, neutralzed with NaHCO$_3$ and diluted with 100 parts of distilled water. After treatment by dialysis, the sample was dried to yield the sulfated curdlan. The resulting sulfated curdlan will hereinafter be referred to as "CA7".

Manufacturing Example 14

Curdlan was added in an amount of 0.50 part to 40.0 parts of desiccated pyridine and the resulting mixture was agitated at room temperature for 2 hours. Following agitation, 2.0 parts of piperdine sulfuric acid was added and the reaction was allowed to proceed at 65° C. for 120 minutes. The reaction was vacuum distilled to remove pyridine. Acetone was added to the residue and the resulting precipitate was collected, washed with water, neutralzed with NaHCO$_3$ and diluted with 100 parts of distilled water. After treatment by dialysis, the sample was dried to yield the sulfated curdlan. Hereinafter, this will be referred to as "CA8".

Manufacturing Example 15

Curdlan was added in an amount of 0.50 part to 40.0 parts of dessicated pyridine and the resulting mixture was agitated at room temperature for 2 hours. At the end of the 2 hour agitation period, 2.0 parts of hydrochloric acid was added after which the reaction was allowed to proceed at 80° C. for 60 minutes. The mixture was then vacuum distilled to remove pyridine. Acetone was added to the residue and the resulting precipitate was collected and washed with water. After treatment by dialysis the sample was dried. To the dried solids was added 40.0 parts of desiccated pyridine and the resulting mixture was agitated at room temperature for 2 hours. After agitation, 0.1 part of piperdine sulfuric acid was added and the reaction was allowed to proceed at 80° C. for 60 minutes. Acetone was added to the residue and the resulting precipitate was collected, washed with water, neutralzed with NaHCO$_3$ and diluted with 100 parts of distilled water. After treatment by dialysis, the sample was dried to yield the sulfated curdlan. Hereinafter, this will be referred to as "CA9".

Manufacturing Example 16

Curdlan was added in an amount of 0.50 part to 40.0 parts of dessicated pyridine and the resulting mixture was agitated at room temperature for 2 hours. At the end of the 2 hour agitation period, 2.0 parts of hydrochloric acid was added after which the reaction was allowed to proceed at 80° C. for 60 minutes. The mixture was then vacuum distilled to remove pyridine. Acetone was added to the residue and the resulting precipitate was collected, washed with water. After treatment by dialysis the sample was dried. To the dried solids was added 40.0 parts of desiccated pyridine and the resulting mixture was agitated at room temperature for 2 hours. After agitation, 0.2 parts of piperidine sulfuric acid was added and the reaction was allowed to proceed at 80° C. for 60 minutes. Acetone was added to the residue and the resulting precipitate was collected, washed with waters neutralzed with $NaHCO_3$ and diluted with 100 parts of distilled water. After treatment by dialysis, the sample was dried to yield the sulfated curdlan. Hereinafter, this will be referred to as "CA10".

Manufacturing Example 17

Curdlan was added in an amount of 0.50 part to 40.0 parts of dessicated pyridine and the resulting mixture was agitated at room temperature for 2 hours. At the end of the 2 hour agitation period, 5.0 parts of hydrochloric acid was added after which the reaction was allowed to proceed at 80° C. for 30 minutes. The mixture was then vacuum distilled to remove pyridine. Acetone was added to the residue and the resulting precipitate was collected and washed with water. After treatment by dialysis the sample was dried. To the dried solids was added 40.0 parts of desiccated pyridine and the resulting mixture was agitated at room temperature for 2 hours. After agitation, 0.2 parts of piperidine sulfuric acid was added and the reaction was allowed to proceed at 80° C. for 60 minutes. The reaction was vacuum distilled to remove pyridine. Acetone was added to the residue and the resulting precipitate was collected, washed with water, neutralzed with $NaHCO_3$ and diluted with 100 parts of distilled water. After treatment by dialysis, the sample was dried to yield the sulfated curdlan. Hereinafter, this will be referred to as "CA11".

Manufacturing Example 18

Curdlan was added in an amount of 0.50 part to 40.0 parts of dessicated pyridine and the resulting mixture was agitated at room temperature for 2 hours. At the end of the 2 hour agitation period, 5.0 parts of hydrochloric acid was added after which the reaction was allowed to proceed at 80° C. for 30 minutes. The mixture was then vacuum distilled to remove pyridine. Acetone was added to the residue and the resulting precipitate was collected and washed with water. After treatment by dialysis the sample was dried. To the dried solids was added 40.0 parts of desiccated pyridine and the resulting mixture was agitated at room temperature for 2 hours. After agitation, 0.2 parts of piperidine sulfuric acid was added and the reaction was allowed to proceed at 80° C. for 60 minutes. The reaction was vacuum distilled to remove pyridine. Acetone was added to the residue and the resulting precipitate was collected, washed with water, neutralzed with $NaHCO_3$ and diluted with 100 parts of distilled water. After treatment by dialysis, the sample was dried to yield the sulfated curdlan. Hereinafter, this will be referred to as "CA12".

The average molecular weights and sulfur contents of the sulfated polysaccharides obtained in the abovementioned manufacturing examples are given in Table 1.

TABLE 1

| Sample | | Average Molecular Weight[1] (×10$^4$) | Sulfur Content[2] (wt. %) | Water Solubility[3] (g) |
|---|---|---|---|---|
| CLS | sulfated cellulose | 10.3 | 10.41 | 8.1 |
| XGS | sulfated xanthan gum | 8.4 | 13.10 | 8.8 |
| MC1 | sulfated cellulose ether | 15.0 | 5.7 | 8.5 |
| MC2 | | 13.4 | 10.4 | 9.8 |
| MC3 | | 14.1 | 12.6 | 10.5 |
| MC4 | | 16.5 | 18.5 | 10.8 |
| CA1 | sulfated curdlan | 12.7 | 7.9 | 9.9 |
| CA2 | | 10.0 | 12.2 | 9.8 |
| CA3 | | 9.0 | 15.6 | 10.9 |
| CA4 | | 13.3 | 19.4 | 12.5 |
| CA5 | | 0.6 | 1.24 | 9.8 |
| CA6 | | 0.5 | 19.51 | 12.6 |
| CA7 | | 19.1 | 1.33 | 7.0 |
| CA8 | | 19.3 | 19.41 | 11.6 |
| CA9 | | 0.5 | 0.02 | 9.1 |
| CA10 | | 0.6 | 0.09 | 9.5 |
| CA11 | | 4.9 | 0.02 | 6.3 |
| CA12 | | 4.8 | 0.09 | 7.0 |

[1]GPC analysis, pullulan equivalent
[2]Combustion tube method sulfur analysis
[3]Weight of Sample dissolved in 10 g of water adjusted to 20° C.

There follow non-limiting examples of using the cement additives of this invention in concrete.

APPLICATION EXAMPLES 1–18

Concrete mixtures each of 80 liters were prepared using the mix proportions given in Table 2 and designed for target slump flow of 550 to 600 mm and target air content of 4.5% by volume.

TABLE 2

| Water-cement ratio | Sand-aggregate ratio (%) | Unit Content (kg/m$^3$) | | | |
|---|---|---|---|---|---|
| | | Water | Cement | Fine Aggregate | Coarse Aggregate |
| 0.529 | 50.0 | 185 | 350 | 867 | 870 |

The materials were mixed in a 100-liter pan-type power-driven blade mixer for 90 seconds to give high fluidity, low segregation concretes. The concretes obtained are sampled immediately after mixing and after elapse of 60 minutes and the slump flows, air contents, times of setting and segregation resistance properties as represented by flow times are measured, while evaluations are made by visual observations. Furthermore, compressive strengths of the concretes at 28-day age are measured. The results of these are given in Table 3.

Comparative tests are conducted using a concrete to which melamine sulfonate formalin condensate salt, a commercially available high-range water-reducing agent, has been added (Comparison Example 1) and a concrete to which melamine sulfonate formalin condensate salt and cellulose ether have been added (Comparison Example 2). Water-reducing ratios, air entraining properties, reductions in fluidity with elapse of time, times of setting, segregation resistance properties and compressive strengths with Examples 1 to 18 (samples: CLS, XGS, MC1-4, CA1-12) are compared. The results are given in Table 3.

Methods of Measurement
1. Slump flow
   According to Guide to Design and Construction of Underwater Non-segregating Concrete, published May 17, 1991 by Japan Society of Civil Engineers, pp. 72–3.
2. Flow Time
   Segregation resistance is evaluated measuring the time until spreading of flow stopped. Further, when in the range of target slump flow (550 to 600 mm), flow time of 55 seconds or more indicates segregation resistance.
3. Visual Observations
   The conditions of segregation are visually observed to judge segregation resistance and the classifications below were made.

A: Cement, water, fine aggregate and coarse aggregate flow as one and a favorable segregation resistance is observed.
B: Good segregation resistance is observed, but cohesion is excessive.
C: Segregation of the materials used is observed.
4. Air Content
   According to JIS (Japanese Industrial Standard) A 1128
5. Compressive Strength
   According to JIS A 1118
6. Time of Setting
   According to JIS A 6204, Appendix 2.
Materials Used:
1. Fine Aggregate
   Pit sand from Oi River System (specific gravity=2.63, fineness modulus=2.75), from Ogasa Kaihatsu, Shizuoka, Japan.
2. Coarse Aggregate
   Omi graywacke (specific gravity=2.64, maximum size= 20 mm), from Okutama Kogyo, Tokyo, Japan.
3. Cement
   Ordinary portland cement (specific gravity =3.16, manufactured by Onoda Cement, Tokyo, Japan).
4. High range water reducing agent
   Melamine sulfonate formalin condensate, NL-4000 (hereinafter referred to as "MS") manufactured by Nisso Master Builders, Japan.
5. Thickener
   Cellulose ether, 90-SH30,000 manufactured by ShinEtsu Chemical (hereinafter referred to as "MC")

TABLE 3

| | | | Slump Flow | | | | Setting Time | | Segregation Resistance | | Compressive |
| | Cement Additive | | (mm) | | Air Content[2] | | | | Flow | | Strength |
| | | Dosage[1] | As | At 60 | As | At 60 | (hr-min) | | time | Visual | 28 Day |
| | Sample | (C×%) | mixed | min. | mixed | min. | Initial | Final | (sec) | Observation | (kgf/cm$^2$) |
|---|---|---|---|---|---|---|---|---|---|---|---|
| Ex. 1 | MC1 | 0.5 | 550 | 540 | 4.9 | 4.8 | 6-35 | 9-00 | 73 | A | 480 |
| Ex. 2 | MC2 | 0.5 | 570 | 570 | 4.8 | 4.6 | 6-40 | 9-00 | 75 | A | 482 |
| Ex. 3 | MC3 | 0.5 | 590 | 585 | 4.4 | 4.4 | 6-45 | 9-00 | 70 | A | 488 |
| Ex. 4 | MC4 | 0.5 | 600 | 600 | 4.5 | 4.3 | 6-55 | 8-45 | 70 | A | 487 |
| Ex. 5 | CA1 | 0.5 | 570 | 570 | 4.5 | 4.6 | 6-55 | 8-50 | 66 | A | 485 |
| Ex. 6 | CA2 | 0.5 | 600 | 605 | 4.4 | 4.4 | 6-30 | 8-40 | 60 | A | 486 |
| Ex. 7 | CA3 | 0.5 | 580 | 590 | 4.4 | 4.3 | 6-50 | 9-00 | 61 | A | 487 |
| Ex. 8 | CA4 | 0.5 | 600 | 600 | 4.3 | 4.4 | 6-45 | 8-50 | 62 | A | 490 |
| Ex. 9 | CA5 | 0.5 | 540 | 520 | 4.5 | 4.1 | 6-40 | 8-55 | 58 | A | 482 |
| Ex. 10 | CA6 | 0.5 | 540 | 525 | 4.6 | 4.2 | 6-35 | 8-50 | 57 | A | 482 |
| Ex. 11 | CA7 | 0.5 | 555 | 535 | 4.5 | 4.0 | 6-45 | 8-55 | 68 | A | 486 |
| Ex. 12 | CA8 | 0.5 | 585 | 560 | 4.4 | 4.3 | 6-35 | 8-35 | 72 | A | 487 |
| Ex. 13 | MS CA9 | 0.5 0.1 | 540 | 500 | 4.3 | 4.0 | 6-50 | 9-05 | 68 | A | 486 |
| Ex. 14 | MS CA10 | 0.5 0.1 | 545 | 510 | 4.4 | 4.1 | 6-55 | 9-05 | 66 | A | 484 |
| Ex. 15 | MS CA11 | 0.5 0.1 | 535 | 500 | 4.3 | 4.0 | 6-55 | 9-00 | 75 | A | 485 |
| Ex. 16 | MS CA12 | 0.5 0.1 | 535 | 505 | 4.3 | 4.0 | 6-50 | 8-55 | 74 | A | 483 |
| Ex. 17 | CLS | 0.5 | 560 | 545 | 4.6 | 4.3 | 6-30 | 8-45 | 73 | A | 480 |
| Ex. 18 | XGS | 0.5 | 560 | 535 | 4.4 | 4.2 | 6-45 | 9-00 | 66 | A | 486 |
| Comp. Ex. 1 | MS | 0.5 | 600 | 450 | 4.0 | 3.5 | 6-55 | 9-00 | 46 | C | 420 |
| Comp. Ex. 2 | MS MC | 0.7 0.2 | 500 | 410 | 4.8 | 4.2 | 10-10 | 12-35 | 100 | B | 440 |

[1]Percent by weight of cement (in terms of solids)
[2]Air contents of Example 1 to 12, 17–18 and Comparison Example 1 were adjusted as necessary using an air content adjusting agent and of Examples 13–16 and Comparison Example 2 using a defoaming agent.

The results given in Table 3 show the following for cases in which cement additives of this invention are used (Examples 1 to 18).
1. Water-reducing properties
   As is clear from the comparison with Comparison Example 1, water-reducing properties equal to those of a high-range water-reducing agent are given
2. Air-entraining properties
   The air-entraining properties are extremely weak, but the air content of Comparison Example 2 is high and it is adjusted by adding a defoaming agent.
3. Reduction in Fluidity due to Elapse of Time
   There is hardly any reduction in slump flow after elapse of 60 minutes, and time-dependent reduction in fluidity is extremely small.
4. Time of Setting
   As is clear from comparison with Comparison Example 1, a setting time equivalent to that of high-range water-reducing agent is obtained, and the time of setting is not retarded. In contrast, Comparison Example 2 shows set retardation of about 3 hours.

5. Segregation Resistance

As is clear on comparing with Comparison Example 2, equal segregation resistance is obtained with a smaller dosage, and moreover, a high fluidity is obtained.

6. Compressive Strength (Age 28 days)

As is clear from comparisons with Comparison Example 1, compressive strengths 14 to 17% higher than those obtainable by use of a high-range water-reducing agent are obtained. As for comparisons with Comparison Example 2, compressive strengths about 10% higher are obtained.

APPLICATION EXAMPLES 19–21

Concrete mixtures were prepared according to application examples 1–18, above, using the mix proportions given in Table 4 designed for target flow of 450 to 550 mm and target air content of 4.0% by volume. The concretes obtained were sampled immediately after mixing and after elapse of 60 minutes, and the slump flows, air contents, and flow times were measured. Further, evaluations were made of underwater segregation resistance by visual observation. The results of these are given in Table 5.

TABLE 4

| Water/Cement Ratio | Sand/Aggregate Ratio | UNIT CONTENT (KG/M³) | | | |
|---|---|---|---|---|---|
| | | Water | Cement | Fine Aggregate | Coarse Aggregate |
| 0.541 | 46.0 | 200 | 370 | 778 | 917 |

The results of tests of Examples 19–21 (samples: MC2, CA2, CA3) and a concrete to which commercially available admixtures for nonsegregating underwater concrete had been added (Comparison Example 3) and a concrete to which a melamine sulfonate formalin condensate and a high-range water-reducing agent had been added (Comparison Example 4) to compare water-reducing ratios, air-entraining properties, reductions in fluidity with elapse of time and underwater segregation resistance are given in Table 5.

Methods of Measurement

The methods of measurement were the same as those used for the data obtained for Table 4. Visual Observation 2 was as follows: 1,500 mL of water was introduced into a 2,000 mL graduate cylinder. 250 g of mixed concrete was allowed to fall freely inside the graduate cylinder. Evaluations of the turbidity of the water were made by visual observation one minute after free fall.

A: Cement, water, fine aggregate and coarse aggregate flowed as one, good segregation resistance ws indicated and no turbidity was observed.

B: Segregation resistance was recognized but a certain degree of turbidity was observed.

C: Segregation was recognized but extreme turbidity was observed.

TABLE 5

| | Cement Additive | | Slump Flow | Air Content[2] | Segregation Resistance and Underwater Segregation Resistance | | |
|---|---|---|---|---|---|---|---|
| | Sample | Dosage[1] | (mm) | (%) | Flow Time (sec) | Visual Observation 1 | Visual Observation 2 |
| Ex. 19 | MC2 | 0.70 | 526 | 4.1 | 80 | A | A |
| Ex. 20 | CA2 | 0.70 | 521 | 4.2 | 82 | A | A |
| Ex. 21 | CA3 | 0.70 | 525 | 4.3 | 84 | A | A |
| Comp. Ex. 3 | AK-12SS AK-SP | 0.20 0.80 | 530 | 4.3 | 80 | A | A |
| Comp. Ex. 4 | MS | 0.70 | 510 | 4.2 | 50 | B | C |

[1]Percent by weight of cement (in terms of solids).
[2]Air contents were adjusted as necessary using an air content adjusting agent.

The results given in Table 5 show the following for cases in which cement additives of this invention are used (Examples 19–21).

1. Water-reducing Property:

As is clear on comparing with Comparison Example 3, equal water-reducing properties were indicated with a quantity smaller than the dosage of admixture for nonsegregating underwater concrete.

2. Air-entraining Property:

The air entraining properties of the concretes prepared according to the present invention were comparable to those of the comparative examples.

3. Segregation Resistance:

Flow time was longer than that of the concrete of Comparision Example 4 in which a high-range water-reducing agent had been used, and was equal to that of Comparison Example 3. Further, as is clear from Visual Observation 1, equal segregation resistance as in Comparison Example 3 was indicated.

4. Underwater Segregation Resistance:

From visual observation 2, the concrete of Comparison Example 4 showed extreme segregation underwater so that turbidity of water occurred, whereas similarly to Comparison Example 3, segregation underwater was not recognized and turbidity of water did not occur.

APPLICATION EXAMPLES 22–24

(High-strength Concrete)

High-strength concrete mixtures were prepared according to application examples 1–18, above, using the mix proportions given in Table 6 designed for target slump of 23±2 cm and target air content of 4.0% by volume. The high-strength concretes obtained were sampled immediately after mixing and after elapse of 60 minutes, and the slump flows, air contents, flow times and 28-day compressive strengths were measured. The results of these are given in Table 7.

TABLE 6

| Water/Cement Ratio | Sand/Aggregate Ratio (%) | UNIT CONTENT (Kg/m³) | | | |
|---|---|---|---|---|---|
| | | Water | Cement | Coarse Aggregate | Fine Aggregate |
| 0.30 | 40.6 | 165 | 550 | 663 | 974 |

The results of tests of Examples 22 to 24 (samples: MC2, CA2, CA3) and a concrete to which melamine sulfonate formalin condensate, a commercially available high-range water-reducing agent, had been added (Comparison Example 5), and a concrete to which naphthalene sulfonate formalin condensate had been added (Comparison Example 6) to compare water-reducing ratios, air-entraining properties, reductions in fluidity with elapse of time, times of setting and compressive strengths are given in Table 7.

Methods of Measurement
1) Slump:
   According to JIS A 1101.
2) Slump Flow:
   According to Guide to Design and Construction of Non-segregating Underwater Concrete (Draft), Japan Society of Civil Engineers.
3) Air Content:
   According to JIS A 1128.
4) Compressive Strength:
   According to JIS A 1118.
5) Time of Setting:
   According to JIS A 6204, Appendix 1.

TABLE 7

| | Cement Additive | | Slump | Slump Flow | Air Content[2] | Setting Time (hr-min) | | Compressive Strength[3] |
|---|---|---|---|---|---|---|---|---|
| | Sample | Dosage[1] | (cm) | (mm) | (%) | Initial | Final | (Kgf/cm²) |
| Ex. 22 | MC2 | 0.7 | 22.0 | 430 | 4.5 | 9-00 | 10-45 | 950 |
| Ex. 23 | CA2 | 0.7 | 21.5 | 420 | 4.0 | 8-50 | 10-30 | 955 |
| Ex. 24 | CA3 | 0.7 | 22.0 | 440 | 4.1 | 8-40 | 10-15 | 954 |
| Comp. Ex 5 | MS | 0.92 | 22.5 | 425 | 4.0 | 9-50 | 11-00 | 948 |
| Comp. Ex 6 | BNS | 0.84 | 21.0 | 455 | 4.3 | 10-33 | 11-55 | 944 |

[1]Percent by weight of cement (in terms of solids).
[2]Air contents were adjusted as necessary using air content adjusting agent.
[3]The Compressive strengths were measured at 28 days.

As is clear from the results in Table 7, the effects of using the cement additives of the present invention in high-strength concrete are as follows:

1) Water-reducing property:
As is clear on comparing with Comparison Examples 5 and 6, equal slumps and slump flows were indicated with smaller dosages and an excellent water-reducing property was indicated.

2) Air-entraining property:
The air-entraining properties were comparable to the Comparison Examples.

3) Time of Setting:
Equal time of setting was indicated compared with Comparison Example 5, while a tendency of faster initial and final sets compared with Comparison Example 6 were observed.

4) Compressive Strength:
The 28-day compressive strength was comparable to the concretes containing high-range water-reducing agents (Comparative Ex. 5 and 6).

APPLICATION EXAMPLES 25–27

(Concrete Products)

Concrete mixtures were prepared according to application examples 1–18, above, using the mix proportions given in Table 8 designed for target slump of 8±1 cm and target air content of 2.0% by volume. The concretes obtained were sampled immediately after mixing and after elapse of 60 minutes, and the slump flows, air contents, 28-day compressive strengths, and compressive strengths of concretes subjected to steam curing were measured. The esthetic appearance of the concrete surface texture was evaluated by visual observation. The results of these are given in Table 9.

TABLE 8

| Water/Cement Ratio | Sand/Aggregate Ratio (%) | UNIT CONTENT (Kg/m³) | | | |
|---|---|---|---|---|---|
| | | Water | Cement | Fine Aggregate | Coarse Aggregate |
| 0.356 | 40.0 | 160 | 450 | 713 | 1074 |

The results of tests of Examples 25 to 27 (samples: MC3, CA2, CA3) and a concrete to which melamine sulfonate formalin condensate, a commercially available high-range water-reducing agent, had been added (Comparison Example 7), and a concrete to which naphthalene sulfonate formalin condensate had been added (Comparison Example 8) to compare water-reducing ratios, air-entraining properties, reductions in fluidity with elapse of time and compressive strengths are given in Table 9.

Methods of Measurement

The slump, air content and compressive strengths were measured as in Table 7.

Steam Curing Conditions:

After precuring under conditions of 20° C. for 2 hours, the temperature was raised to 65° C. at a temperature rise rate of approximately 18.0° C./hr. After steam curing at 65° C. continuously for 3 hours, cooling was done at 20° C. at a cooling rate of approximately 4.30° C./hr.

Visual Observation 3:

Specimens of member dimensions 10×10×50 cm were made to observe the surface texture of concrete and the surface texture of concrete-after hardening was observed by visual inspection.

A: A condition of extremely good esthetic appearance with no irregularities, honeycombing, or air bubbles at the surface of concrete.

B: A condition of poor esthetic appearance with irregularities, honeycombing or air bubbles at the concrete surface conspicuous to a certain extent.

TABLE 9

| | Cement additive | | Slump | Air Content[2] | Compressive Strength (kgf/cm³) | |
|---|---|---|---|---|---|---|
| | Sample | Dosage[1] | (cm) | (%) | Standard Curing | Steam Curing |
| Ex. 25 | MC3 | 0.20 | 8.0 | 2.0 | 703 | 404 |
| Ex. 26 | CA2 | 0.20 | 8.0 | 2.0 | 703 | 407 |
| Ex. 27 | CA3 | 0.20 | 8.0 | 1.9 | 702 | 410 |
| Comp. Ex 7 | MS | 0.30 | 8.0 | 2.0 | 700 | 406 |
| Comp. Ex 8 | BNS | 0.30 | 8.5 | 2.1 | 690 | 392 |

[1]Percent by weight of cement (in terms of solids).
[2]Air Contents were adjusted as necessary using air content adjusting agent.
[3]The age for standard curing was 28 days, and that for steam curing was 18 hours.

As can be seen from the results reported in Table 9, when the cement additives of the present invention are used in concrete products (Application Examples 25 to 27), the following effects were observed:

1) Water-reducing Properties: On comparing with Comparison Examples 7 and 8, similar water-reducing properties were observed with small dosages.
2) Air-Entraining Properties: Comparative air-entraining properties were also observed.
3) Compressive Strength: Compressive Stengths with either standard or steam curing were equal as is clear from comparisons with Comparison Examples 7 and 8.
4) Concrete Surface Texture:

As is clear from Visual Observation 3, the surface texture esthetic appearances were equal to that in Comparison Example 7, and better than in Comparison Example 8.

APPLICATION EXAMPLES 28–30

(Lean-Mix Concrete)

Lean-Mix concrete mixtures were prepared according to application examples 1–18, above, using the mix proportions given in Table 10 designed for target slump of 18±1 cm and target air content of 5.0% by volume. The lean-mix concretes obtained were sampled immediately after mixing and after elapse of 60 minutes, and the slumps, air contents, 28-day compressive strengths and bleeding were measured. Furthermore, the workabilities of fresh concretes were evaluated by visual inspection. The results of these are given in Table 11.

TABLE 10

| Water/ Cement Ratio | Sand/ Aggregate Ratio (%) | UNIT CONTENT (Kg/m³) | | | |
|---|---|---|---|---|---|
| | | Water | Cement | Coarse Aggregate | Fine Aggregate |
| 0.65 | 46.0 | 184 | 283 | 811 | 971 |

The results of tests of Examples 28 to 30 (samples: MC3, CA2, CA3) and a concrete to which a commercially available admixture for lean-mix concrete was added (Comparison Example 9), a concrete to which melamine sulfonate formalin condensate was added (Comparison Example 10) and a concrete to which naphthalene sulfonate formalin condensate had been added (Comparison Example 11) to compare water-reducing ratios, air-entraining properties, reductions in fluidity with elapse of time, times of setting and compressive strengths are given in Table 11.

Methods of Measurement

Slump, Air Content, and Compressive Strength were measured as previously. Time of Setting was measured according to JIS A 6204, Appendix 1. Bleeding was measured according to JIS A 1123. Visual Observation 4 was determined as follows:

To evaluate workability of concrete, the condition of deformation of slump, and further, the condition of deformation of slumped concrete by tamping were observed by visual inspection.

A: There was good balance between fluidity and cohesion of concrete, and slump did not show disintegration of slumped concrete in deformation due to tamping.

B: There was poor balance between fluidity and cohesion of concrete, and a tendency for a part or the whole to disintegrate when slumping was indicated. Furthermore, there was overall disintegration in deformation of slumped concrete due to tamping.

TABLE 11

| | | Cement Additive | | Slump | Air Content[2] | Bleeding | Compressive Strength 28-Day | Workability Visual Observation 4 |
|---|---|---|---|---|---|---|---|---|
| | | Sample | Dosage[1] | (cm) | (%) | (cm³/cm²) | (kgf/cm²) | |
| Example | 28 | MC3 | 0.23 | 17.5 | 4.7 | 0.34 | 334 | A |
| | 29 | CA2 | 0.23 | 18.0 | 4.4 | 0.35 | 337 | A |

TABLE 11-continued

|  |  | Cement Additive | | Slump (cm) | Air Content[2] (%) | Bleeding (cm³/cm²) | Compressive Strength 28-Day (kgf/cm²) | Workability Visual Observation 4 |
|---|---|---|---|---|---|---|---|---|
|  |  | Sample | Dosage[1] | | | | | |
|  | 30 | CA3 | 0.23 | 18.0 | 4.5 | 0.33 | 336 | A |
| Comparison | 9 | 70L | 0.25 | 18.0 | 4.5 | 0.37 | 334 | A |
| Example | 10 | MS | 0.25 | 17.5 | 4.4 | 0.43 | 336 | B |
|  | 11 | BNS | 0.25 | 18.0 | 4.6 | 0.46 | 333 | B |

Note
[1] Percent by weight of cement (in terms of solids).
[2] Air contents were adjusted as necessary using air content adjusting agent.

The cement additives of this invention excel in usability since the effect of a high-range water-reducing agent and the effect of a thickner can be simultaneously obtained. It can be used with extreme advantage in the manufacture of cement mixtures such as high-fluidity, low-segregation concrete, high-strength concretet, nonsegregating underwater concrete, concrete products in concrete and lean-mix concrete. Furthermore, as the cement additives of this invention are readily soluble in water, the handling properties are very good.

We claim:

1. A hardenable cementitious composition comprising cement and an amount of a sulfated polysaccharide effective to maintain desired fluidity of the cementitious composition, said sulfated polysaccharide comprising dextran sulfates, starch sulfates, natural gum sulfates or curdlan sulfates.

2. A hardenable cementitious composition comprising cement and an amount of a cement additive effective to maintain desired fluidity of the cementitious composition, said cement additive consisting essentially of a cellulose sulfate.

3. A hardenable cementitious composition according to claim 1 wherein the sulfated polysaccharide is a curdlan sulfate.

4. A hardenable cementitious composition according to claim 1 wherein the sulfated polysaccharide has an average molecular weight of from 5,000–200,000.

5. A hardenable cementitious composition according to claim 1 wherein the sulfated polysaccharide has an average molecular weight of from 90,000–165,000.

6. A hardenable cementitious composition according to claim 1 wherein the sulfated polysaccharide has an average molecular weight of from 100,000–150,000.

7. A hardenable cementitious composition according to claim 1 wherein the sulfated polysaccharide has a sulfur content of from 1–20% by weight.

8. A hardenable cementitious composition according to claim 1 wherein the sulfated polysaccharide has a sulfur content of from 5.5–20%.

9. A hardenable cementitious composition according to claim 1 wherein the sulfated polysaccharide has a sulfur content of from 12–20%.

10. A hardenable cementitious composition according to claim 2 wherein the cellulose sulfate is a cellulose ether sulfate.

11. A hardenable cementitious composition according to claim 2 wherein the cellulose sulfate has an average molecular weight of from 5,000–200,000.

12. A hardenable cementitious composition according to claim 2 wherein the cellulose sulfate has an average molecular weight of from 90,000–165,000.

13. A hardenable cementitious composition according to claim 2 wherein the cellulose sulfate has an average molecular weight of from 100,000–150,000.

14. A hardenable cementitious composition according to claim 2 wherein the cellulose sulfate has a sulfur content of from 1–20% by weight.

15. A hardenable cementitious composition according to claim 2 wherein the cellulose sulfate has a sulfur content of from 5.5–20%.

16. A hardenable cementitious composition according to claim 2 wherein the cellulose sulfate has a sulfur content of from 12–20%.

17. A process of modifying flow characteristics of a fluid cementitious mix, comprising adding to a cementitious mix an amount of a sulfated polysaccharide effective to maintain desired fluidity of the cementitious mix, said sulfated polysaccharide comprising dextran sulfates, starch sulfates, natural gum sulfates or curdlan sulfates.

18. A process according to claim 17 wherein the sulfated polysaccharide is a curdlan sulfate.

19. A process according to claim 13 wherein the sulfated polysaccharide has an average molecular weight of from 5,000–200,000.

20. A process according to claim 17 wherein the sulfated polysaccharide has an average molecular weight of from 90,000–165,000.

21. A process according to claim 17 wherein the sulfated polysaccharide has an average molecular weight of from 100,000–150,000.

22. A process according to claim 17 wherein the sulfated polysaccharide has a sulfur content of from 1–20% by weight.

23. A process according to claim 17 wherein the sulfated polysaccharide has a sulfur content of from 5.5–20%.

24. A process according to claim 17 wherein the sulfated polysaccharide has a sulfur content of from 12–20%.

25. A process of modifying flow characteristics of a fluid cementitious mix comprising adding to a cementitious mix an amount of a cement additive effective to maintain desired fluidity of the cementitious composition, said cement additive consisting essentially of a cellulose sulfate.

26. A process according to claim 25 wherein the cellulose sulfate is a cellulose ether sulfate.

27. A process according to claim 25 wherein the cellulose sulfate has an average molecular weight of from 5,000–200,000.

28. A process according to claim 25 wherein the cellulose sulfate has an average molecular weight of from 90,000–165,000.

29. A process according to claim 25 wherein the cellulose sulfate has an average molecular weight of from 100,000–150,000.

30. A process according to claim 25 wherein the cellulose sulfate has a sulfur content of from 1–20% by weight.

31. A process according to claim 25 wherein the cellulose sulfate has a sulfur content of from 5.5–20%.

32. A process according to claim 25 wherein the cellulose sulfate has a sulfur content of from 12–20%.

* * * * *